Sept. 30, 1952 J. J. WIEGMAN 2,612,384
TRAILER HITCH
Filed Sept. 1, 1950

INVENTOR.
JOHN J. WIEGMAN
BY Charles R Werner
ATTORNEY

Patented Sept. 30, 1952

2,612,384

UNITED STATES PATENT OFFICE 2,612,384

TRAILER HITCH

John J. Wiegman, Englewood, Colo., assignor of one-fourth to Sam E. Kelley, Denver, Colo.

Application September 1, 1950, Serial No. 182,645

2 Claims. (Cl. 280—33.44)

This invention relates in general to trailer hitches and in particular to a retractable trailer hitch fully enclosed in the rear storage compartment of a motor vehicle when not in use.

Insofar as I am aware all trailer hitches are exposed at the rear of the vehicle and whether permanently or temporarily attached, are unsightly and not in keeping with the new streamline design of motor vehicles. Also, on the exterior of a vehicle there is usually no particularly desirable position for trailer hitch mounting, desirable, that is, from a stress standpoint.

My invention will permit removably locating the trailer hitch from view except when it is in use, and it will be firmly secured to the structural members of the frame of the vehicle so that stresses will be distributed and will not cause damage to the vehicle.

The objects of my invention are, first; to provide a trailer hitch which will be fully enclosed in the rear storage compartment of a motor vehicle when not in use.

Second; to provide a trailer hitch of the class described, hidden from sight when not in use but slidably movable to hitching position and not interfering with the opening and closing of the storage compartment door.

Third; to provide a trailer hitch of the class described which is held in hitching or retracted position by the latch of the storage compartment door.

Fourth; to provide a trailer hitch of the class described which is securely fastened to the structural members of the vehicle and which has a sliding hitch portion movable into exposed and trailer hitching position and which is retractable into concealed position within the storage compartment when not in use.

Other objects and advantages as well as the construction and operation of my invention will be apparent by reference to the following decription in connection with the accompanying drawing in which.

Figure 1:
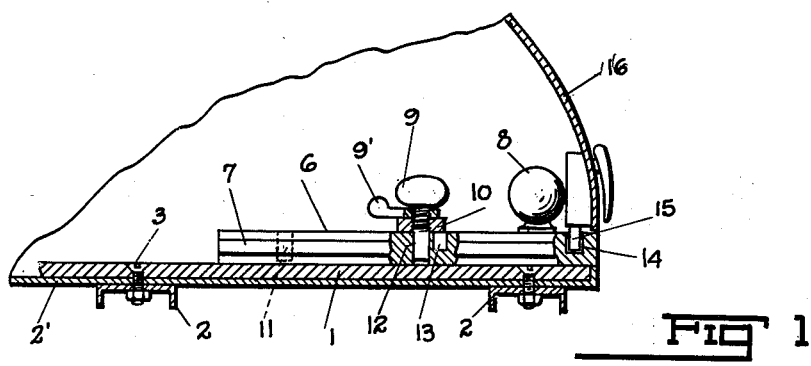
Fig. 1 is a longitudinal cross sectional view through the hitch comprising my invention mounted in the rear storage compartment of a motor vehicle, the device being shown in retracted position.
Figure 2:
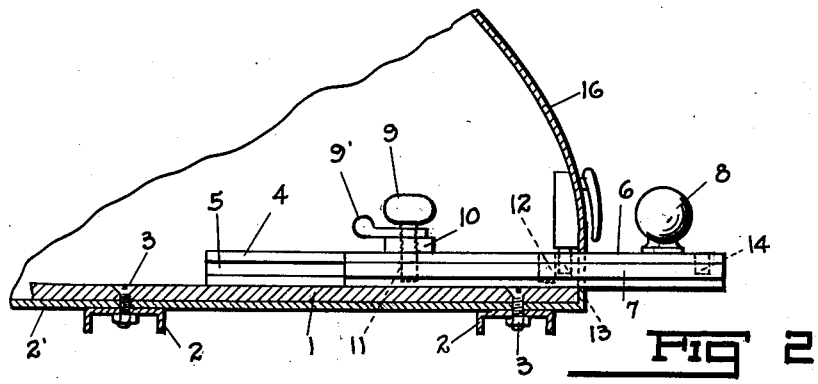
Fig. 2 is a similar section with the device in trailer hitching or extended position.
Figure 3:
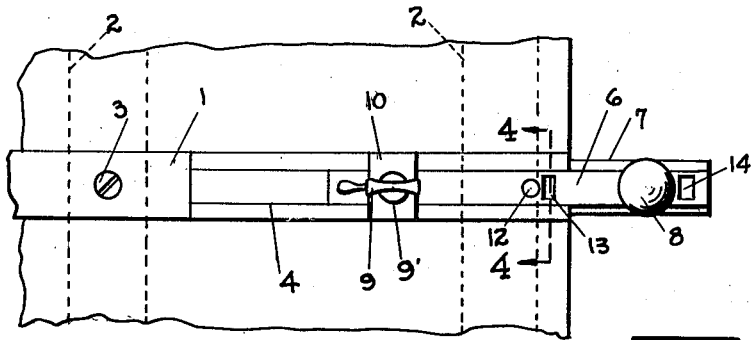
Fig. 3 is a top plan view of the hitch in extended position.
Figure 4:
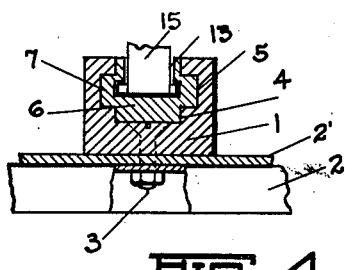
Fig. 4 is an enlarged cross sectional view through the hitch on the line 4—4 of Fig. 3.

Referring now to the drawing by numerals of reference, 1 designates a guide plate securely fastened to structural members 2 of the vehicle frame by suitable fastening members 3 passing through floor 2' of the rear compartment.

A longitudinal groove 4 is provided in the guide plate with side grooves 5, a slide plate 6 being slidably carried in groove 4 and having side tongues 7 slidably carried in the side grooves 5.

A suitable ball 8 is secured adjacent the rear end of the slide plate 6 for reception of the socket normally used on the trailer tongue. A thumb screw 9 with lock nut 9' is threadedly received by the bridge 10 fastened to guide plate 1, the thumb screw being adapted to enter suitable openings 11 or 12. When the thumb screw engages opening 11 the hitch is in extended and trailer hitching position; when the thumb screw engages opening 12 the hitch is in retracted and concealed position; in both positions the lock nut 9' securely holds the thumb screw from accidental turning.

Since it is desirable that the hitch be located on the longitudinal central axis of the vehicle and since the rear compartment door latch usually is located on this same axis I have provided novel means for permitting operation of the door latch and the hitch without interference one with the other.

Latch receiving openings 13 and 14 are provided and are of a size and configuration necessary to suitably receive the latch 15 of rear compartment door 16 on the particular vehicle concerned. The trailer hitch and latch may be of suitable design on new vehicles so that a standard size and shape may be used for all vehicles. It will be seen that when the slide plate 6 is in extended or trailer hitching position the door latch 15 will engage opening 13 and when the slide plate is in retracted or hitch concealing position the door latch 15 will engage opening 14.

The device is so designed that none of the stresses encountered when a trailer is being hauled will be transmitted to the door latch through the slide plate 6, these stresses being taken by the thumb screw which engages the openings 11 and 12 in the slide plate 6.

From the foregoing it will be apparent that I have provided a new and novel trailer hitch which, when not in use is normally retracted and concealed in the rear storage compartment of a motor vehicle ready for quick and expeditious extension into trailer hitching position, the hitch cooperating with the compartment door latch so that said latch will function with the hitch either in extended or retracted position. It will also be apparent that stresses exerted by the load being pulled will be directed through the hitch to the structural members of the vehicle.

It is obvious that changes in form, proportion and details of construction may be resorted to without departing from the spirit of my invention and I reserve all rights to such changes as come within the scope of these specifications and the claims which follow.

What I claim as new and desire to secure by Letters Patent is:

1. In combination with the rear storage compartment and the compartment door and latch of a motor vehicle, a trailer hitch comprising a guide positioned in the storage compartment, a slidable hitch plate adjustably locked in the guide spaced openings in the hitch plate, the compartment door latch engaging one of the openings when the slidable hitch plate is in retracted or extended position.

2. In combination with the rear storage compartment and the compartment door and latch of a motor vehicle, a trailer hitch comprising a guide positioned in the storage compartment, a hitch plate slidably carried by the guide, a locking member for the hitch plate, openings in the hitch plate engageable by the locking member and located for locking of said hitch plate in retracted or extended position, latch openings in the hitch plate, one opening engageable by the latch when the hitch plate is in retracted position and the other opening being engageable by the latch when the hitch plate is in extended position.

JOHN J. WIEGMAN.

REFERENCES CITED

The following references are of record in the file of this patent:

UNITED STATES PATENTS

| Number | Name | Date |
| --- | --- | --- |
| 2,425,838 | Schultz | Aug. 19, 1947 |